United States Patent
Luthardt et al.

(10) Patent No.: US 12,078,505 B2
(45) Date of Patent: Sep. 3, 2024

(54) ROADWAY MAPPING DEVICE

(71) Applicant: Continental Automotive GmbH, Hannover (DE)

(72) Inventors: Stefan Luthardt, Darmstadt (DE); Stefan Boschenriedter, Darmstadt (DE); Phillip Hossbach, Darmstadt (DE); Clemens Linnhoff, Darmstadt (DE); Siqian Wu, Darmstadt (DE)

(73) Assignee: Continental Automotive GmbH, Hannover (DE)

( * ) Notice: Subject to any disclaimer, the term of this patent is extended or adjusted under 35 U.S.C. 154(b) by 370 days.

(21) Appl. No.: 17/249,221

(22) Filed: Feb. 24, 2021

(65) Prior Publication Data
US 2021/0180980 A1 Jun. 17, 2021

Related U.S. Application Data (63) Continuation of application No. PCT/DE2019/200104, filed on Aug. 29, 2019.

(30) Foreign Application Priority Data

Aug. 30, 2018 (DE) ............... 10 2018 214 697.7

(51) Int. Cl.
*G01C 21/00* (2006.01)
(52) U.S. Cl.
CPC ..... *G01C 21/3815* (2020.08); *G01C 21/3819* (2020.08); *G01C 21/3837* (2020.08); *G01C 21/3848* (2020.08); *G01C 21/3881* (2020.08)
(58) Field of Classification Search
CPC ............ G01C 21/3815; G01C 21/3819; G01C 21/3837; G01C 21/3848; G01C 21/3881
See application file for complete search history.

(56) References Cited

U.S. PATENT DOCUMENTS

| 6,470,265 B1 | 10/2002 | Tanaka |
| 8,762,041 B2 * | 6/2014 | Lindner ............ G01C 21/3605 701/425 |

(Continued)

FOREIGN PATENT DOCUMENTS

| CN | 1284191 A | 2/2001 |
| CN | 107545232 A | 1/2018 |

(Continued)

OTHER PUBLICATIONS

Ming Yang et al., A New Approach to High-accuracy Road Orthophoto Mapping Based on Wavelet Transform, Dec. 2011, International Journal of Computational Intelligence Systems, 4(6):1367, https://www.researchgate.net/publication/314362422 (Year: 2011).*

(Continued)

*Primary Examiner* — Vivek D Koppikar
*Assistant Examiner* — Farhad Dawodi (57) ABSTRACT

A roadway mapping device for a vehicle includes a camera unit for detecting image data and a control unit. The control unit is configured to determine roadway regions in the image data detected by the camera unit. The control unit is further configured to transform the image data, including the determined roadway regions, into a bird's-eye view by utilizing inverse perspective imaging and to project same onto a plane. The control unit is further configured to add the determined roadway regions to a grid map in the plane. Furthermore, the control unit is configured to align at least two grid maps from two different journeys with respect to each other and to combine them to create a final grid map of the roadway regions.

22 Claims, 4 Drawing Sheets

(56) References Cited

U.S. PATENT DOCUMENTS

| | | | |
|---|---|---|---|
| 10,054,458 B2* | 8/2018 | Oh | G06V 20/582 |
| 2004/0218910 A1* | 11/2004 | Chang | G01C 21/3647 |
| | | | 386/328 |
| 2016/0140718 A1* | 5/2016 | Ishida | H04N 13/239 |
| | | | 345/419 |
| 2016/0188983 A1* | 6/2016 | Suzuki | G06V 20/588 |
| | | | 382/104 |
| 2016/0307052 A1* | 10/2016 | Han | G06V 20/588 |
| 2017/0344021 A1* | 11/2017 | Sano | G05D 1/0257 |
| 2017/0369057 A1 | 12/2017 | Gurghian et al. | |
| 2018/0024239 A1* | 1/2018 | Branson | G01S 13/931 |
| | | | 701/23 |
| 2018/0053060 A1 | 2/2018 | Huang et al. | |
| 2018/0074506 A1* | 3/2018 | Branson | G01S 13/867 |
| 2018/0164832 A1 | 6/2018 | You et al. | |
| 2018/0188372 A1* | 7/2018 | Wheeler | G01C 21/30 |
| 2018/0225527 A1* | 8/2018 | He | G06V 10/82 |
| 2018/0232947 A1* | 8/2018 | Nehmadi | G01S 7/295 |
| 2019/0129431 A1* | 5/2019 | Yalla | G01C 21/3848 |
| 2019/0317505 A1* | 10/2019 | Li | G01C 21/3837 |

FOREIGN PATENT DOCUMENTS

| | | | | |
|---|---|---|---|---|
| CN | 107767696 A | | 3/2018 | |
| CN | 108216242 A | | 6/2018 | |
| CN | 107735794 B | * | 6/2021 | G06K 9/0063 |
| JP | 2017157087 A | | 9/2017 | |

OTHER PUBLICATIONS

Ming Yang, et al., "A New Approach to High-accuracy Road Orthophoto Mapping Based on Wavelet Transform", International Journal of Computational Intelligence Systems, Dec. 1, 2011 (Dec. 1, 2011), pp. 1367-1374. XP055642262.

Fritsch Jannik, et al., "Monocular Road Terrain Detection by Combining Visual and Spatial Information", IEEE Transactions on Intelligent Transportation Systems, IEEE, Piscataway, NJ, USA, Bd. 15, Nr. 4, Aug. 1, 2014 (Aug. 1, 2014), pp. 1586-1596, XP011555192.

A. Wedel et al., "B-Spline Modeling of Road Surfaces With an Application to Free-Space Estimation", IEEE Transactions on Intelligent Transportation Systems, Bd. 10, Nr. 4, Dec. 4, 2009 (Dec. 4, 2009), pp. 572-583, XP055555368.

Miguel Oliveira et al., "Multimodal inverse perspective mapping", Information Fusion., Bd. 24, Jul. 1, 2015 (Jul. 1, 2015), pp. 108-121, XP055642214.

Cheng Zhao, et al., Map-Build Algorithm Based on the Relative Location of Feature Points, Springer International Publishing AG 2017, ICIG 2017, Parr III, LNCS 10668, pp. 400-411 ,2017.

Deutsches Patent—und Markenamt Search Report dated Jun. 4, 2019 for the counterpart German Application No. 10 2018 214 697.7.

International Search Report and the Written Opinion of the International Searching Authority mailed on Dec. 4, 2019 for the counterpart PCT Application No. PCT/2DE019/200104.

Chinese First Office Action dated Feb. 23, 2024 for the counterpart Chinese Patent Application No. 201980057202.0 and machine translation of same.

\* cited by examiner

ROADWAY MAPPING DEVICE

CROSS-REFERENCE TO RELATED APPLICATIONS

This application is a continuation of International application No. PCT/DE2019/200104, filed Aug. 29, 2019, which claims priority to German patent application No. DE 10 2018 214 697.7, filed Aug. 30, 2018; each of which is hereby incorporated by reference.

TECHNICAL FIELD

The technical field relates generally to a roadway mapping device for a vehicle and a method for mapping a roadway.

BACKGROUND

The development of driver assistance systems up to automated driving has been increasingly attracting attention for a number of years. A key component of said systems is an accurate perception of the environment. This comprises, inter alia, further road users, the infrastructure and courses of roadways. In addition to signal processing by sensors directly in the vehicle, precise, digital maps are also indispensable for the navigation of autonomous systems. The process of creating these maps by conventional surveying methods is complex, tedious, and costly.

In order to map complex road networks, it is necessary to follow all of the associated roads with one or more mobile measuring vehicles. This means high personnel costs and considerable expenditure for constructing, providing and operating the measuring vehicles with special measuring set-ups.

As such, it is desirable to present a reliable road map. In addition, other desirable features and characteristics will become apparent from the subsequent summary and detailed description, and the appended claims, taken in conjunction with the accompanying drawings and this background.

BRIEF SUMMARY

One embodiment relates to a roadway mapping device for a vehicle. The roadway mapping device comprises a camera unit for detecting image data and a control unit. The control unit is configured to determine roadway regions, e.g., asphalt, tar, or concrete regions, in the image data detected by the camera unit. The control unit is further configured to transform the image data, including the determined roadway regions, into a bird's-eye view by means of inverse perspective imaging and to project same onto a plane which preferably corresponds to the road surface in a good approximation. The control unit is configured to add the determined roadway regions to a grid map in the plane. Furthermore, the control unit is configured to align at least two grid maps from two different journeys with respect to each other and to combine them to create a final grid map of the roadway regions.

Consequently, a precise digital map of the roadway regions can be created precisely, simply and continually, from which it can be inferred where roadway regions are located and where they are not. In other words, where vehicles can drive and where they cannot. Further, varying circumstances such as construction sites or parking areas can also be recognized and mapped. In other words, the map can be continually supplemented and amended. Furthermore, the determination and positioning of the determined roadway regions can be averaged and, consequently, inaccuracies can be compensated for by the multiplicity of (at least two) grid maps, from which the final grid map of the roadway regions is created. Furthermore, the probability increases that all of the roadway regions have been determined at least once with a multiplicity of journeys. Furthermore, the roadway mapping device can map the roadway independently of any existing roadway markings.

For the mapping, the roadway mapping device may include a camera unit, and a control unit. The camera unit can detect or produce image data of the vehicle environment. It should be noted that the camera unit can also be a stereo camera or a surround view camera. The camera unit can further comprise depth and/or height information for objects in the image data and for regions in the image data. The depth or height information can be provided, for example, via additional sensors such as a lidar, a radar or an ultrasonic sensor but also by a stereo camera. Furthermore, the detected image data can be classified by the control unit, for example whether it is an urban environment, a rural environment, a highway, day, night, summer, or winter. The control unit can further evaluate the image data and determine roadway regions therein. For example, the control unit can determine dark regions close to the ground as roadway regions, however a curbstone or curb can serve as a demarcation between the footpath and the roadway. It should be noted that, for the determination, the control unit can deploy an artificial neural network which has been trained in the determination of roadway regions. In order to use the image data for the utilization as a map, said data are transformed into the bird's-eye view or a top view. This can take place, for example, by inverse perspective imaging. The transformed image data can subsequently be projected onto a plane which is advantageously arranged at the level of the roadway surface and parallel to this. Said plane can, for example, be a grid map, to which the determined roadway regions are added. For a more accurate localization and positioning and an improved grid map, multiple grid maps of different journeys can be aligned with respect to each other and can be combined with each other so that a final grid map of the roadway regions is created by the control unit. The accuracy and the reliability of the digital map can be increased by aligning and combining multiple grid maps. In particular, the multiple grid maps can originate from different directions of travel so that traffic islands and access roads from different perspectives can also be mapped in detail. The final grid map of the roadway regions can subsequently be converted into a digital map or digital road map, so that said map can subsequently serve as a basis for navigation for vehicles.

Roadway regions can be understood to be regions which can be driven along by a vehicle, for example, asphalt or concrete regions. By contrast, sidewalks can be recognized as a non-roadway region, in particular the curbstone can serve as a demarcation.

It should be noted that the image data, in addition to camera data, can also be lidar, radar or ultrasonic data or can be supplemented by said data. In particular, depth and height information can consequently be obtained.

The bird's-eye view substantially depicts a top view which can, however, also comprise an angle with respect to the perpendicular, e.g., of ±20°.

It should be noted that the roadway region can also be designated a road region or a section of a road.

It should be noted that the control unit can also be a control circuit, a circuit, a processor, or a computing unit.

The term "digital maps" or "digital map data" is also to be understood to be maps for advanced driver assistance systems (ADAS) or automated or autonomous driving, without navigation happening.

According to an embodiment, the projection plane is at the level of the roadway surface. The control unit is further configured to correct the roadway regions in the image data by means of height information. In order to correct or in order to distinguish roads and buildings or walls, the control unit can consider height or depth information in the image data or objects contained in the image data. Consequently, buildings or walls can be simply and reliably disregarded during the determination of the roadway regions so that only roadway regions are determined. In particular, it can be considered that the roadway regions are typically to be found lying flat in front of or next to the vehicle. The roadway region or the non-roadway region can further be corrected for errors, e.g. if a relatively small area has been determined as a roadway region, but is surrounded by a non-roadway region, it can be assumed that this is an error, or it can be corrected. Alternatively or additionally, this can also be performed for a non-roadway region which is surrounded by a roadway region.

According to an embodiment, the control unit is configured to classify individual regions in the image data as a roadway and non-roadway and, thus, to determine roadway regions therein by means of an artificial neural network.

The neural network can simply, quickly and reliably evaluate or analyze the image data and determine roadway regions therein or distinguish the same from other regions in the image data. To this end, the neural network can have been trained accordingly during the preliminary stages. It should be noted that the neural network can be a recurrent neural network (RNN) or a convolutional neural network (CNN), however it is not limited thereto. It is also possible to deploy a pre-trained network for image processing which can additionally be retrained.

According to a further embodiment, the control unit is configured to align the at least two grid maps, on the basis of features contained in the grid maps, with respect to each other and to combine them to create the final grid map of the roadway regions.

Prominent features, such as, e.g., traffic circles, intersections, or traffic islands can be enlisted for the alignment and the combination of multiple grid maps from multiple journeys. The alignment can in particular take place due to a local shift of the individual grid cells of the grid maps. Said local shift of individual points can be determined as a suitable combination of the established shift of neighboring points.

According to an embodiment, the control unit is configured to determine a probability value for the correct determination for each determined roadway region and, if the probability value is higher than or exceeds a predefined threshold, to mark the respective roadway region as a roadway in the grid map.

It can consequently be ensured that only roadway regions which have been reliably determined as a roadway region are included in the final grid map. Consequently, the error rate and the false determination rate can be reduced. The probability value can in particular depend on the number of the determinations or recognitions based on the number of the journeys. The more frequently a roadway region has been determined as such, the higher the probability can be that this is actually a roadway region. Only if the probability value is higher than a predefined threshold, e.g. 80%, is the particular roadway region entered in the final grid map as a roadway.

According to an embodiment, the roadway mapping device further comprises a positioning unit. Said positioning unit is configured to determine the position of the roadway mapping device, of determined roadway regions or of points in the grid map.

The positioning unit can serve to class the individual final grid maps of the roadway regions in a global coordinate system and to add said grid maps to a digital road map. The positioning unit can, for example, determine the positions by means of satellite navigation (GPS or Galileo) or by means of mobile radio tracking. The error during the individual positioning can further be averaged out in the final grid map by way of the large number of the individual determined positions of the features and of the roadway regions (during each journey). Furthermore, the positioning can be supported by odometry (trip counters in the car) and further improved. Consequently, an accurate mapping of the roadway regions can be achieved.

Moreover, it should be pointed out that, in the context of the present invention, GPS stands for all global navigation satellite systems (GNSS) such as, e.g., GPS, Galileo, GLONASS (Russia), Compass (China) or IRNSS (India).

It should be pointed out at this juncture that the position of the vehicle can also be determined by way of cell positioning. This is in particular possible when using GSM, UMTS or LTE networks. Alternatively or additionally, the position can also be determined in a camera-based manner.

According to an embodiment, the at least two grid maps for creating the final grid map originate from image data from at least two different directions of travel.

For an improved mapping of the roadway regions in the final grid map of the roadway regions, the grid maps which are enlisted for the production of the final grid map of the roadway regions can have been acquired from various directions of travel, for example a north-south journey and a south-north journey. Consequently, both sides of the road were also driven on, and access roads and intersections can be detected and determined by various perspectives.

According to a further embodiment, the control unit is configured to determine an outer contour of the regions determined as a roadway region in the grid map. Alternatively or additionally, the control unit can also depict the outer contour by geometrical curves, e.g., B-splines, which represent a smoothed outer contour. Thanks to the use of the outer contour and/or geometric curves, storage space can be saved since the limit curve merely has to be depicted and not the entire area.

According to an embodiment, the roadway mapping device further comprises a sending/receiving unit which is configured to transfer or to send the grid map, the detected image data or the transformed image data to a backend or to another vehicle.

In order to transfer the detected image data, the transformed image data or the grid maps, or to receive the final grid map, the roadway mapping device can comprise a sending/receiving unit. The latter can in particular send the created grid maps having the determined roadway regions to a backend which subsequently carries out the further processing and the production of the final grid map of the roadway regions. Alternatively or additionally, the backend itself can also perform the transformation and the production of the grid maps from the detected image data. Consequently, computing capacity on the roadway mapping device can be saved since the calculations are performed in the backend. The transfer can be advantageously effected wirelessly or by radio.

The wireless transfer or the wireless receipt of the grid maps can be effected by Bluetooth, WLAN (e.g., WLAN 802.11a/b/g/n or WLAN 802.11p), ZigBee, or WiMax or cellular radio systems such as GPRS, UMTS, 3G, 4G or LTE. The use of other transfer protocols is also possible. The indicated protocols offer the advantage of the standardization already effected.

According to an embodiment, the camera unit includes a stereo camera.

A further aspect relates to a backend for roadway mapping. The backend comprises a sending/receiving unit which is configured to receive a grid map from a roadway marking device according to any one of the preceding claims. The backend is configured to receive at least two grid maps from at least two roadway mapping devices of one or different vehicles and to align said grid maps with respect to each other and to combine them to create a final grid map of the roadway regions.

In addition to the production of the final grid maps of the roadway regions on the control unit of the roadway mapping device, a backend can also carry out the production of the final grid map. Consequently, grid maps can be created by a multiplicity of vehicles having the roadway mapping device, which are subsequently received by the backend, aligned with respect to each other and combined to create the final grid map of the roadway regions. In other words, a final grid map of the roadway regions can be created centrally by a multiplicity of vehicles. Consequently, further error influences such as the individual sensor tolerances and driving method can also be averaged out. The backend can further make the final grid map of the roadway regions available to the vehicles. Consequently, a final grid map of the roadway regions or digital road map can further be created simply, quickly, continually and inexpensively. Furthermore, the backend can also send the final grid map back to the roadway mapping device.

A backend is understood to be a central or decentralized computing unit which can exchange data with the individual roadway mapping devices. Said data exchange can in particular take place via the internet or a comparable network. The backend can, for example, be executed as a server which processes and stores the grid maps of the multiplicity of vehicles. Consequently, it is not necessary for every vehicle to perform the evaluation, and the final grid map or the digital road map can also be created more quickly and more reliably by a multiplicity of vehicles.

A further aspect relates to a vehicle having a roadway mapping device described above and below.

The vehicle is, for example, a motor vehicle such as a car, bus or truck, or an aircraft such as a helicopter or airplane, or, for example, a bicycle.

A further aspect relates to a method for mapping a roadway. The method comprises the following steps:
   detecting of image data by a camera unit;
   determining of roadway regions in the detected image data by the control unit;
   transforming of the detected image data, including the determined roadway regions, into a bird's-eye view and projecting of the transformed image data onto a plane which is at the level of the roadway surface;
   adding of the roadway regions to a grid map in the plane;
   aligning of at least two grid maps from two different journeys with respect to each other and combining them; and
   creating a final grid map based on the aligned and combined grid maps.

It should be noted that the steps of the method can also be executed in a different order or simultaneously. There can also be a longer period of time between individual steps.

A further aspect relates to a program element which, if it is run on a control unit of a roadway mapping device, instructs the roadway mapping device to perform the method described above and below.

A further aspect relates to a computer-readable medium, on which a program element is stored, which, if it is run on a control unit of a roadway mapping device, instructs the roadway mapping device to perform the method described above and below.

BRIEF DESCRIPTION OF THE DRAWINGS

Further features, advantages and possible applications of the invention are set out by the following description of the exemplary embodiments and the figures.

The figures are schematic and not to scale. If the same reference numerals are indicated in the following description of the figures, these denote the same or similar elements.

DETAILED DESCRIPTION

Figure 1:
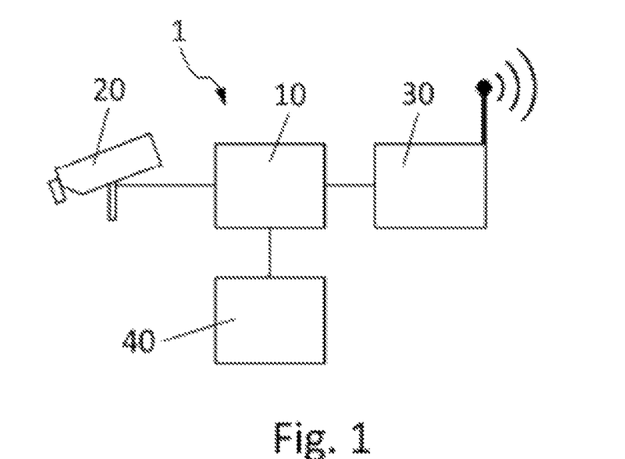
FIG. 1 shows a block diagram of a roadway mapping device according to an embodiment.

FIG. 1 shows a roadway mapping device 1 which includes a control unit 10 and a camera unit 20. The roadway mapping device 1 can optionally further include a sending/receiving unit 30 and a positioning unit 40. In this case, the camera unit 20 detects image data of the vehicle surroundings. Said image data can be evaluated by the control unit 10 in order to determine roadway regions therein. For the determination of the roadway regions, the control unit 10 can use an artificial neural network. In other words, the control unit 10 can ascertain which parts of the image of the image data are roadway regions and which are not. Furthermore, the control unit 10 can transform the image data and, in particular, the determined roadway regions into a bird's-eye view by means of inverse perspective imaging and project same onto a plane. It should be noted that the bird's-eye view can be a top view which can, however, also comprise an angle such as e.g. ±20° to the perpendicular. It should further be noted that the plane, onto which the image data are projected, should preferably correspond to the road surface in a good approximation. Furthermore, the control unit 10 can correct the image data by means of depth or height information in the image data so that roadway regions can be distinguished from buildings and walls. For the depth or height information, the control unit 10 can consider image data of a stereo camera, a lidar, a radar or an ultrasonic sensor. The control unit 10 can, following the transformation, add the determined roadway regions to a grid map in the plane so that a mapping of the roadway is created. The roadway mapping device 1 can repeat this operation for multiple journeys and directions of travel. Finally, the control unit 10 can align the created grid maps of multiple different journeys with respect to each other and combine them with each other so that the final grid map of the roadway regions is created. The aligning and combining can, in particular, be conducted with the aid of multiple prominent features such as e.g. traffic islands, intersections, turns, traffic circles in the grid maps. The control unit 10 can further determine a probability value for the correct recognition of a roadway region and, if this is higher than a predefined threshold, the particular roadway region can be marked in the grid map as a roadway. Alternatively or additionally, the control unit 10 can also determine the outer contour of the determined roadway region in the final grid map of the roadway regions. Furthermore, the outer contour can also be represented and smoothed by geometric curves. Consequently, the file size of the final grid map can be reduced since only the boundaries between the roadway region and non-roadway region have to be stored.

The positioning unit 40 can determine the position of the roadway mapping device 1 (that is to say the ego position), the position of a determined roadway region or the position of a point of the grid map with respect to a global coordinate system. The positioning unit 40 can, for example, comprise a GPS module or a comparable satellite navigation module. Alternatively or additionally, the positioning unit 40 can also determine the positions via mobile radio. The position can also be determined in a camera-based manner.

The roadway mapping device 1 can further transfer or send the created grid map having the determined roadway regions to a backend by means of a sending/receiving unit 30. The backend can subsequently align multiple grid maps of different vehicles with respect to each other and combine the same to create a final grid map of the roadway regions. To this end, the sending/receiving unit 30 can in particular have a wireless data transfer, for example WLAN, or mobile radio. The backend can further be connected to the roadway mapping device 1 via the internet or a comparable network.

Figure 2:
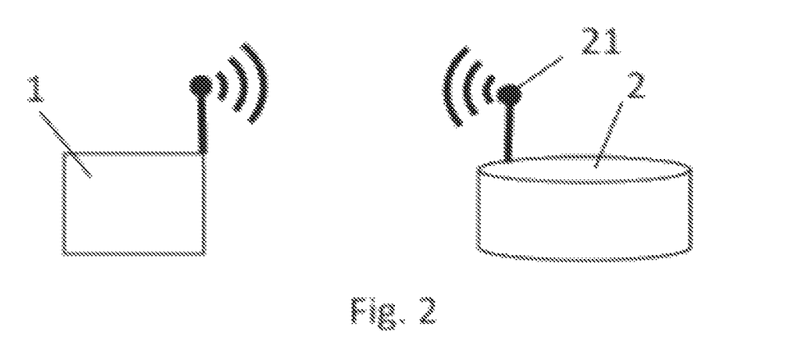
FIG. 2 shows a block diagram of a roadway mapping device and a backend for roadway mapping according to an embodiment.

FIG. 2 shows a block diagram of a roadway mapping device 1 and a backend 2. The roadway mapping device 1 and the backend 2 are connected to each other via an at least partially wireless data connection, e.g., mobile radio or WLAN. The roadway mapping device 1 can in this case send, transfer, or transmit the created grid maps to the backend 2. The backend 2 can receive grid maps from multiple different roadway mapping devices 1 in different vehicles. The backend 2 can subsequently align said multiplicity of grid maps with respect to each other and combine same to create a final grid map of the roadway regions. In other words, the backend 2 can produce a map having roadway regions from the results of a multiplicity of roadway mapping devices 1. It should be noted that the backend 2 can also send the final grid map to the roadway mapping device 1 or to a vehicle having the roadway mapping device 1, so that the vehicle can constantly comprise the current final grid map of the roadway regions.

Figure 3:
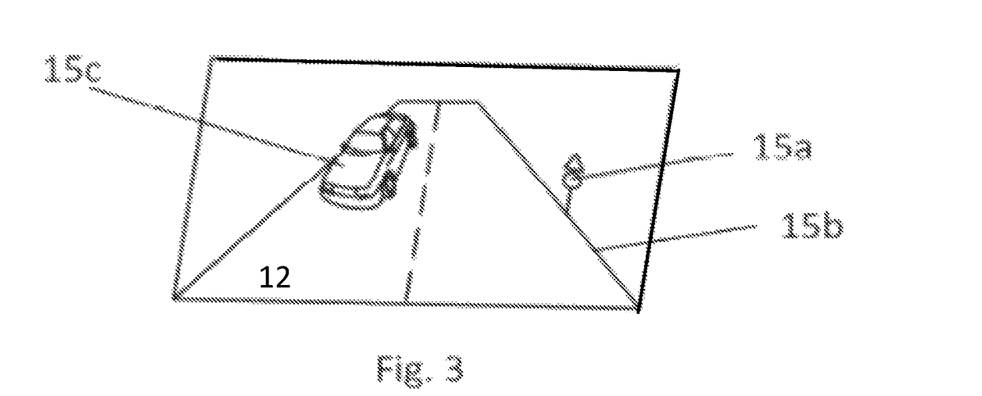
FIG. 3 shows image data which have been detected by the camera unit.

FIG. 3 shows exemplary image data of the camera unit. The image data show, in the example from FIG. 3, the course of the roadway ahead of the vehicle. The control unit is configured to analyze the detected image data of the camera unit and to determine or to recognize roadway region 12. The recognized roadway region 12 is represented in FIG. 3 as an area between the pair of non-parallel line segments corresponding to the road. The remaining parts of the image such as, for example, another vehicle, a traffic sign 15a or the edge 15b of the road are recognized as non-roadway regions 13. The determined roadway regions 12 can subsequently be transformed into a bird's-eye view by means of inverse perspective imaging and projected onto a plane so that these can be added to a grid map.

Figure 6:
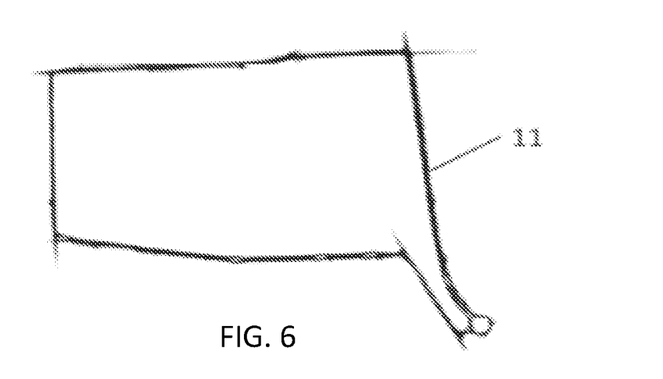
FIG. 6 shows a final grid map of the roadway regions according to an embodiment.

The final grid map of the roadway regions 11 is represented in a bird's-eye view or in a top view and identifies a route having the determined roadway regions, which is followed by the roadway mapping device. The determined roadway regions are represented as being dark and the light regions are not roadway regions. Furthermore, prominent regions in the final grid map of the roadway regions 11 such as, for example, a traffic circle or traffic islands can be recognized. It can further be seen that some roadway regions are represented darker than others, since these were contained in multiple grid maps or comprise a higher probability value for a correct recognition. It should be noted that multiple final grid maps of the roadway regions 11 can be created, which are subsequently merged to form a road map or a map having roadway regions.

Figure 7A:
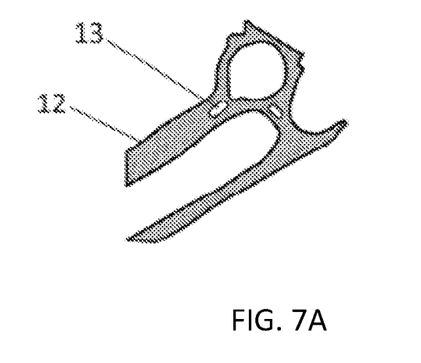
FIG. 7a shows a mapped roadway region having enclosed regions which have not been mapped as a roadway region according to an embodiment.

Determined roadway regions 12 and non-roadway regions 13 can be further recognized. The non-roadway regions 13 can, for example, be traffic islands, on which a vehicle cannot drive. The determined roadway regions 12 can subsequently be adopted in the final grid map of the roadway regions, if they are higher than the predefined threshold for a correct recognition. Furthermore, the determined roadway regions 12 can also be subsequently processed so that smaller interruptions are also incorporated into the roadway region, even if these have been determined as a non-roadway region. In other words, the determining of roadway regions 12 can be corrected for errors if these relate to sufficiently small areas. For example, an area measuring 10×10 cm can be recognized by the roadway mapping device as a non-roadway region 13, however it can be assumed that said region, if it is located in the middle of a roadway region 12, is also part of said roadway region 12.

Figure 7B:
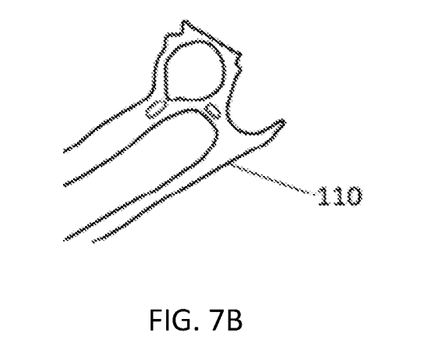
FIG. 7b shows an outer contour of the mapped roadway regions according to an embodiment.

A mapped region or an extract of a final grid map will be described, in which the outer contour 110 has been determined. Said outer contour 110 depicts the boundary between the roadway region and the non-roadway region. By determining the outer contour 110, storage space can be saved since a smaller amount of data has to be stored. The computing unit can further calculate geometric curves, such as, e.g., B-splines, which depict a smoothed outer contour. Consequently, storage space can be further saved since the contour can be depicted with geometric curves, instead of with a plurality of individual points.

Figure 4:
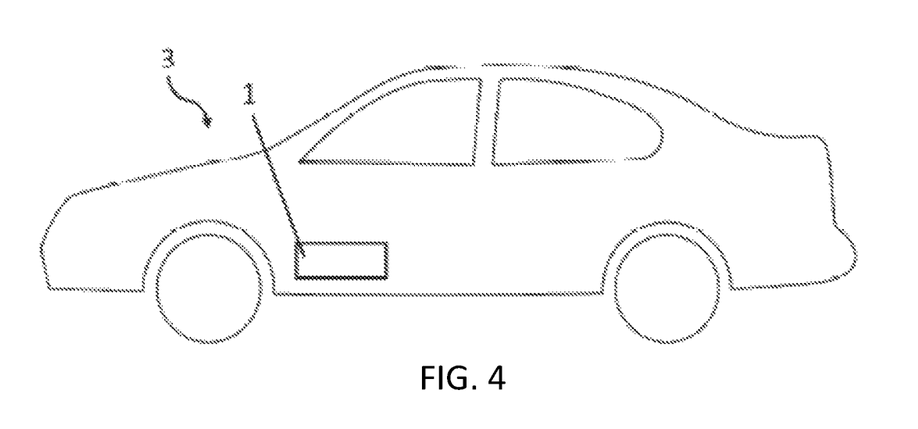
FIG. 4 shows a vehicle having a roadway mapping device according to an embodiment.

FIG. 4 shows a vehicle 3 having a roadway mapping device 1. Said roadway mapping device 1 can also have recourse to sensors already present in the vehicle 3 such as, e.g., a camera, a GPS module, a gyrometer, a lidar, a radar, or an ultrasonic sensor.

Figure 5:
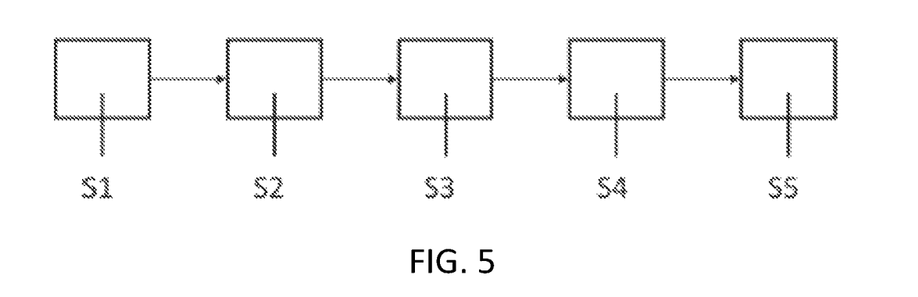
FIG. 5 shows a flow chart for a method for mapping a roadway according to an embodiment.

FIG. 5 shows a flow chart for a method for mapping a roadway. In step S1, image data are detected by a camera unit, e.g., a stereo camera. In step S2, roadway regions are determined in the detected image data; this can take place, for example, with the aid of an artificial neural network. The roadway regions can further be corrected by height information. In step S3, the detected image data and, in particular, the determined roadway regions are transformed into a bird's-eye view (top view) and are projected onto a plane at the level of the roadway surface. Consequently, the image data, which have been detected at a specific angle, are transformed into a 2D top view. In step S4, the determined roadway regions are added to a grid map in the plane. In step S5, at least two but in particular multiple grid maps, which have been created during different journeys, are aligned with respect to each other and combined, so that the final grid map is then created.

FIG. 6 shows a final grid map of the roadway regions 11. The final grid map of the roadway regions 11 is represented in a bird's-eye view or in a top view and identifies a route having the determined roadway regions, which is followed by the roadway mapping device. The determined roadway regions are represented as being dark and the light regions are not roadway regions. Furthermore, prominent regions in the final grid map of the roadway regions 11 such as, for example, a traffic circle or traffic islands can be recognized. It can further be seen that some roadway regions are represented as being darker than others, since these were contained in multiple grid maps or comprise a higher probability value for a correct recognition. It should be noted that multiple final grid maps of the roadway regions 11 can be created, which are subsequently merged to form a road map or a map having roadway regions.

FIG. 7a shows a mapped region or a grid map of a region. Determined roadway regions 12 and non-roadway regions 13 can be further recognized. The non-roadway regions 13 can, for example, be traffic islands, on which a vehicle cannot drive. The determined roadway regions 12 can subsequently be adopted in the final grid map of the roadway regions, if they are higher than the predefined threshold for a correct recognition. Furthermore, the determined roadway regions 12 can also be subsequently processed so that smaller interruptions are also incorporated into the roadway region, even if these have been determined as a non-roadway region. In other words, the determining of roadway regions 12 can be corrected for errors if these relate to sufficiently small areas. For example, an area measuring 10×10 cm can be recognized by the roadway mapping device as a non-roadway region 13, however it can be assumed that said region, if it is located in the middle of a roadway region 12, is also part of said roadway region 12.

FIG. 7b shows a mapped region or an extract of a final grid map, in which the outer contour 110 has been determined. The outer contour 110 depicts the boundary between the roadway region and the non-roadway region. By determining the outer contour 110, storage space can be saved since a smaller amount of data has to be stored. The computing unit can further calculate geometric curves, such as, e.g., B-splines, which depict a smoothed outer contour. Consequently, storage space can further be saved since the contour can be depicted with geometric curves, instead of with a plurality of individual points.

FIG. 4 shows a vehicle 3 having a roadway mapping device 1. The roadway mapping device 1 can also have recourse to sensors already present in the vehicle 3 such as, e.g., a camera, a GPS module, a gyrometer, a lidar, a radar, or an ultrasonic sensor.

Figure 8:
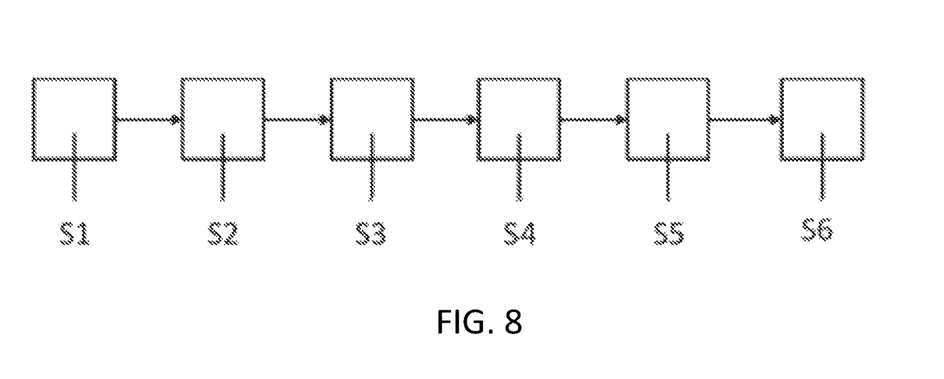
FIG. 8 shows a flow chart for a method for mapping a roadway according to an embodiment.

FIG. 8 shows a flow chart for a method for mapping a roadway. In step S1, image data are detected by a camera unit, e.g. a stereo camera. In step S2, roadway regions are determined in the detected image data; this can take place, for example, with the aid of an artificial neural network. The roadway regions can further be corrected by height information. In step S3, the detected image data and, in particular, the determined roadway regions are transformed into a bird's-eye view (top view) and are projected onto a plane at the level of the roadway surface. Consequently, the image data, which have been detected at a specific angle, are transformed to a 2D top view. In step S4, the determined roadway regions are added to a grid map in the plane. In step S5, at least two but in particular multiple grid maps which have been created during different journeys are aligned with respect to each other and combined by the control unit, so that the final grid map is created in step S6.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A roadway mapping device for a vehicle, comprising:
a camera unit for detecting image data; and
a control circuit including one or more inputs connected to the camera unit over which the image data detected by camera unit is received,
wherein the control circuit is configured to determine roadway regions in the image data detected by the camera unit,
wherein the control circuit is configured to transform the determined roadway regions of the image data into a bird's-eye view by utilizing inverse perspective imaging and to project the transformed roadway regions onto a plane,
wherein the control circuit is further configured to add the projected, transformed roadway regions to a grid map in the plane, and
wherein the control circuit is configured to align at least two grid maps having projected roadway regions from two different journeys with respect to each other and to combine them to create a final grid map of the roadway regions, the final grid map including the projected, transformed, aligned, and combined roadway regions as roadway representations in the final grid map.

2. The roadway mapping device according to claim 1, wherein the projection plane is at the level of the roadway surface, and
wherein the control circuit is further configured to correct the determined roadway regions in the image data by utilizing height information in the image data, the correcting comprising considering height information in the image data or objects contained therein, and discarding, from the image data determined to be roadway regions, one or more sections of the determined roadway regions based on the height information corresponding thereto.

3. The roadway mapping device according to claim 1, wherein the control circuit is configured to determine roadway regions in the image data by utilizing an artificial neural network.

4. The roadway mapping device according to claim 1, wherein the control circuit is configured to align the at least two grid maps, on the basis of features contained in the grid maps, with respect to each other and to combine them to create the final grid map of the roadway regions.

5. The roadway mapping device according to claim 1, wherein the control circuit is configured to determine a probability value for the correct determination for each determined roadway region and, if the probability value is higher than a predefined threshold, to mark the respective roadway region as a roadway.

6. The roadway mapping device according to claim 1, further comprising a positioning unit which is configured to determine the position of at least one of the roadway mapping device, determined roadway regions, and points in the grid map.

7. The roadway mapping device according to claim 1, wherein the at least two grid maps for creating the final grid map originate from image data from at least two different directions of travel.

8. The roadway mapping device according to claim 1, wherein the control circuit is configured to determine an outer contour of the regions determined as a roadway region in the grid map.

9. The roadway mapping device according to claim 1, wherein the control circuit is configured to convert the outer contour of the regions into geometric curves.

10. The roadway mapping device according to claim 1, further comprising a sending/receiving unit which is configured to transfer the grid map to a backend.

11. The roadway mapping device according to claim 1, wherein the camera unit includes a stereo camera.

12. A method for mapping a roadway, comprising:
detecting of image data with a camera unit;
determining roadway regions in the detected image data utilizing the control circuit, the control circuit including an input connected to the camera unit over which the image data is received;
transforming of the detected image data, including the determined roadway regions, into a bird's-eye view and projecting of the transformed image data onto a plane which is at the level of the roadway surface;
adding the roadway regions, as transformed and projected, to a grid map in the plane;
aligning of at least two grid maps from two different journeys with respect to each other and combining them; and
creating of a final grid map based on the aligned and combined grid maps, the final grid map including the roadway regions, as transformed, projected, aligned, and combined serving as roadway representations in the final grid map.

13. The method according to claim 11,
wherein the projection plane is at the level of the roadway surface, and
the method further comprises correcting the determined roadway regions in the image data by utilizing height information, comprising considering height information in the image data or objects contained therein, and discarding, from the determined roadway regions in the image data, one or more sections of the determined roadway regions based on the height information corresponding thereto.

14. The method according to claim 1, wherein aligning the at least two grid maps is performed on the basis of features contained in the grid maps, with respect to each other and combines the grid maps to create the final grid map of the roadway regions.

15. The method according to claim 11, further comprising determining a probability value for a correct determination for each determined roadway region and, if the probability value is higher than a predefined threshold, marking the respective roadway region as a roadway.

16. The method according to claim 11, further comprising determining a position of at least one of the determined roadway regions and points in the grid map.

17. The map according to claim 11, wherein the at least two grid maps for creating the final grid map originate from image data from at least two different directions of travel.

18. The method according to claim 1, further comprising determining an outer contour of the regions determined as a roadway region in the grid map.

19. The method according to claim 18, further comprising converting the outer contour of the regions into geometric curves.

20. The method according to claim 11, wherein the camera unit includes a stereo camera.

21. The roadway mapping device according to claim 1, wherein the final grid map is a bird's-eye view, two-dimensional map.

22. The method according to claim 12, wherein the final grid map is a bird's-eye view, two-dimensional map.

* * * * *